US012725859B2

(12) United States Patent
Xu

(10) Patent No.: US 12,725,859 B2
(45) Date of Patent: Sep. 1, 2026

(54) END COVER ASSEMBLY, BATTERY CELL, BATTERY MODULE, AND ELECTRIC DEVICE

(71) Applicant: Hithium Tech HK Limited, HongKong (CN)

(72) Inventor: Weidong Xu, Xiamen (CN)

(73) Assignee: Hithium Tech HK Limited, Hongkong (CN)

( * ) Notice: Subject to any disclaimer, the term of this patent is extended or adjusted under 35 U.S.C. 154(b) by 488 days.

(21) Appl. No.: 18/533,224

(22) Filed: Dec. 8, 2023

(65) Prior Publication Data

US 2024/0106041 A1 Mar. 28, 2024

Related U.S. Application Data

(63) Continuation of application No. PCT/CN2022/144110, filed on Dec. 30, 2022.

(51) Int. Cl.
*H01M 50/152* (2021.01)
*H01M 50/16* (2021.01)
*H01M 50/533* (2021.01)

(52) U.S. Cl.
CPC ......... *H01M 50/152* (2021.01); *H01M 50/16* (2021.01); *H01M 50/533* (2021.01)

(58) Field of Classification Search
CPC ............. H01M 50/152; H01M 50/153; H01M 50/123; H01M 50/124; H01M 50/533; H01M 10/0422; H01M 10/0427; H01M 10/283; H01M 10/643
See application file for complete search history.

(56) References Cited

U.S. PATENT DOCUMENTS

2012/0214050 A1 8/2012 Kim

FOREIGN PATENT DOCUMENTS

CN 206250226 U 6/2017
CN 206250228 U 6/2017
CN 210272466 U 4/2020

(Continued)

OTHER PUBLICATIONS

CN206250226 English translation. Wang et al. China. Jun. 13, 2017. (Year: 2017).*

(Continued)

*Primary Examiner* — Christopher P Domone

(57) ABSTRACT

Provided are an end cover assembly, a battery cell, a battery module, and an electric device. The end cover assembly includes: a first end cover including a first plastic member provided with a first mounting portion and a first current collector provided with a first mating portion that is assemblable with the first mounting portion; and a second end cover including a second plastic member provided with a second mounting portion and a second current collector provided with a second mating portion that is assemblable with the second mounting portion. The first mounting portion is at least partially different from the second mounting portion and the first mating portion is at least partially different from the second mating portion, allow for mounting interference between the first mounting portion and the second mating portion and mounting interference between the second mounting portion and the first mating portion.

16 Claims, 6 Drawing Sheets

(56) References Cited

FOREIGN PATENT DOCUMENTS

| | | | |
|---|---|---|---|
| CN | 213401337 | U | 6/2021 |
| CN | 214203900 | U | 9/2021 |
| CN | 214542367 | U | 10/2021 |
| CN | 215070163 | U | 12/2021 |
| CN | 215816213 | U | 2/2022 |
| CN | 216389662 | U | 4/2022 |
| CN | 216436009 | U | 5/2022 |
| CN | 216958258 | U | 7/2022 |
| CN | 217426930 | U | 9/2022 |
| JP | 2014029886 | A | 2/2014 |

OTHER PUBLICATIONS

International Search Report and Written Opinion dated Apr. 23, 2023 in International Application No. PCT/CN2022/144110. English translation attached.

The Grant Notice from corresponding Chinese Application No. 202211166768.7 , dated Nov. 21, 2023. English translation attached.

Extended European Search Report from corresponding European Application No. EP22944046.6, dated Dec. 3, 2024.

* cited by examiner

END COVER ASSEMBLY, BATTERY CELL, BATTERY MODULE, AND ELECTRIC DEVICE

CROSS-REFERENCE TO RELATED APPLICATION

This application is a continuation of International Application No. PCT/CN2022/144110, filed on Dec. 30, 2022, which claims priority to Chinese Patent Application No. 202211166768.7 filed on Sep. 23, 2022, the entire disclosure of which is incorporated herein by reference.

FIELD

The present disclosure relates to the field of battery technologies, and more particularly, to an end cover assembly, a battery cell, a battery module, and an electric device.

BACKGROUND

In recent years, the new energy vehicle industry has been given an unprecedented development opportunity. An important factor affecting performance, endurance, and other indicators of a new energy vehicle are performance and reliability of a battery. Main components of the battery include a housing, an end cover assembly, a current collection component, an electrode assembly, and the like. The current collection component is configured to connect the end cover assembly to a tab of the electrode assembly to realize current conduction.

The end cover assembly generally includes a negative current collector disc, a negative lower plastic member, a positive current collector disc, and a positive lower plastic member. During an assembly and a processing of the end cover assembly, an incorrect assembly may easily occur in which the negative current collector disc is misassembled with the positive lower plastic member and the negative lower plastic member is misassembled with the positive current collector disc. If such a problem cannot be found in time, normal use of the battery will be affected. In addition, re-disassembly and re-assembly operations performed after the problem is found would affect normal manufacturing, resulting in reduced manufacturing and assembly efficiency.

SUMMARY

In view of the above, it is necessary to provide an end cover assembly, a battery cell, a battery module, and an electric device, aiming at solving a problem in the related art that an incorrect assembly of components affects manufacturing as well as manufacturing efficiency, and normal use of a battery.

According to embodiments of the present disclosure, an end cover assembly is provided. The end cover assembly includes a first end cover and a second end cover. The first end cover includes a first plastic member and a first current collector. The first plastic member is provided with a first mounting portion. The first current collector is provided with a first mating portion. The first mating portion is assemblable with the first mounting portion. The second end cover includes a second plastic member and a second current collector. The second plastic member is provided with a second mounting portion. The second current collector is provided with a second mating portion. The second mating portion is assemblable with the second mounting portion. The first mounting portion is at least partially different from the second mounting portion, and the first mating portion is at least partially different from the second mating portion, in such a manner that the first mounting portion is not assemblable with the second mating portion, and the second mounting portion is not assemblable with the first mating portion.

Due to at least partially different structural designs between the first mounting portion and the second mounting portion and at least partially different structural designs between the first mating portion and the second mating portion, when an operator mistakenly assembles the first plastic member with the second current collector and the first current collector with the second plastic member during an assembly of the end cover assembly as described above, since the first mounting portion is not assemblable with the second mating portion due to mounting interference therebetween and the second mounting portion is not assemblable with the first mating portion due to mounting interference therebetween, the operator can be promptly reminded of a matching error in components to correct this matching error in time, and then assembles the mated first mounting portion and first mating portion and assembles the mated second mounting portion and second mating portion. Therefore, an assembly of the first plastic member and the first current collector as well as an assembly of the second plastic member and the second current collector can be quickly and accurately completed to obtain the first end cover and the second end cover. As a result, it is possible to effectively avoid the incorrect assembly between the components, which may result in the re-disassembly and re-assembly and thus affect the manufacturing and the manufacturing efficiency of a battery. Therefore, an assembly quality of the battery and normal use of the battery can be ensured.

A further description of technical solutions of the present disclosure will be provided below.

In an embodiment, the first mating portion is an end portion of the first current collector assembled with the first mounting portion. The first mating portion includes a first edge and a second edge opposite to the first edge. The second mating portion is an end portion of the second current collector assembled with the second mounting portion. The second mating portion includes a third edge and a fourth edge opposite to the third edge.

In an embodiment, the first mounting portion includes a first positioning post. The first mating portion includes a first recess formed at the first edge. The first positioning post is configured to be arranged in the first recess.

In an embodiment, the first mounting portion includes a second positioning post. The first mating portion includes a second recess formed at the second edge. The second positioning post is configured to be arranged in the second recess. The second mounting portion includes a third positioning post. The second mating portion includes a third recess formed at the fourth edge. The third positioning post is configured to be arranged in the third recess.

In an embodiment, the first mounting portion further includes a fourth positioning post. The first mating portion further includes a first positioning hole. The fourth positioning post is configured to be inserted into the first positioning hole. The second mounting portion further includes a fifth positioning post. The second mating portion further includes a second positioning hole. The fifth positioning post is configured to be inserted into the second positioning hole. A distance between the second recess and the first positioning hole is unequal to a distance between the third recess and the second positioning hole.

In an embodiment, the first mounting portion further includes a first stop edge configured to be abutted against the first edge for positioning.

In an embodiment, the second mounting portion further includes a second stop edge configured to be abutted against the third edge for positioning.

According to some embodiments of the present disclosure, a battery cell is also provided. The battery cell includes the end cover assembly as described above.

According to some embodiments of the present disclosure, a battery module is also provided. The battery module includes at least one battery cell as described above.

According to some embodiments of the present disclosure, an electric device is also provided. The electric device includes the battery module as described above.

BRIEF DESCRIPTION OF THE DRAWINGS

The accompanying drawings, which constitute a part of the present disclosure, are used to provide a further understanding of the present disclosure. Example embodiments of the present disclosure and description thereof are used to explain the present disclosure, and do not constitute an improper limitation on the present disclosure.

In order to clearly explain technical solutions of embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF REFERENCE NUMERALS OF THE ACCOMPANYING DRAWINGS

Figure 1:
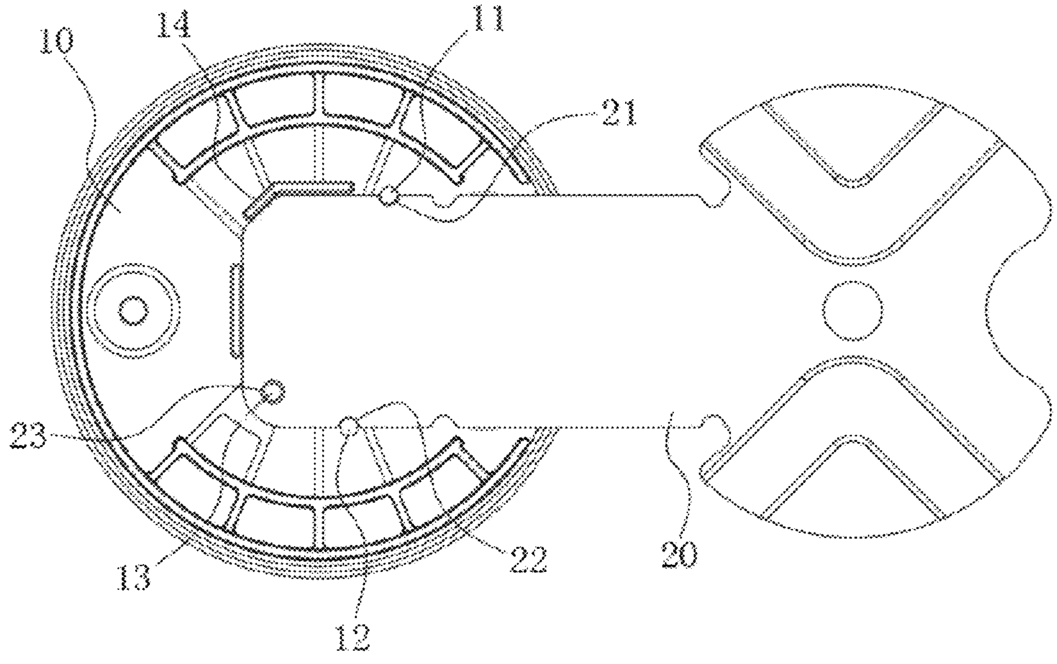
FIG. 1 is a view of an assembled structure of a first plastic member and a first current collector according to an embodiment of the present disclosure.

10, first plastic member; 11, first positioning post; 12, second positioning post; 13, fourth positioning post; 14, first stop edge; 20, first current collector; 21, first recess; 22, second recess; 23, first positioning hole; 30, second plastic member; 31, avoidance region; 32, third positioning post; 33, fifth positioning post; 34, second stop edge; 40, second current collector; 41, planar portion or protruding portion; 42, third recess; 43, second positioning hole.

DETAILED DESCRIPTION

In order to clarify the above-mentioned objects, features, and advantages of the present disclosure, specific embodiments of the present disclosure are described in detail below in conjunction with the accompanying drawings. In the following description, many specific details are provided to facilitate a full understanding of the present disclosure. However, the present disclosure can be implemented in various manners other than those described herein, and similar improvements can be made by those skilled in the art without contradicting the intent of the present disclosure. Therefore, the present disclosure is not limited by specific embodiments disclosed below.

Embodiments of the present disclosure provide a battery cell. In an embodiment, the battery cell is a cylindrical battery. The cylindrical battery includes an end cover assembly, a housing, an electrode assembly, and an electrolyte. The housing has an opening and an accommodation cavity in communication with each other. During mounting, the electrolyte is injected into the electrode assembly, and the electrode assembly is then loaded into the accommodation cavity through the opening. Then, the end cover assembly is sealingly mounted at the opening. In this way, a packaged cylindrical battery is obtained.

It may be noted that, the cylindrical battery generally further includes other components such as an explosion-proof valve, which will not be introduced and described herein due to their less association with the embodiments of the present disclosure.

The electrode assembly includes a positive tab and a negative tab. The end cover assembly is arranged at an opening of the housing and cover the opening. A positive current collection member is connected to the positive tab. A negative current collection member is connected to the negative tab.

The end cover assembly includes an end cover body and a current collection member. The end cover body is provided with a positive pole and a negative pole spaced apart from each other. The end cover assembly may include two current collection members, i.e., a positive current collection member and a negative current collection member. The positive current collection member is connected to the positive pole, and the negative current collection member is connected to the negative pole.

The electrode assembly is composed of a positive electrode plate, a negative electrode plate, and a separator. The battery cell mainly operates based on movements of metallic ions between the positive electrode plate and the negative electrode plate. The positive electrode plate includes a positive current collector and a positive active substance layer. The positive active substance layer is coated on a surface of the positive current collector. The positive current collector with no positive active substance layer coated protrudes from the positive current collector coated with the positive active substance layer. The positive current collector with no positive active substance layer coated serves as the positive tab.

Taking a lithium ion battery as an example, the positive current collector may be made of aluminum, and the positive active substance may be lithium cobaltate, lithium iron phosphate, lithium ternary, lithium manganate, or the like. The negative electrode plate includes a negative current collector and a negative active substance layer. The negative active substance layer is coated on a surface of the negative current collector. The positive current collector with no negative active substance layer coated protrudes from the positive current collector coated with the negative active substance layer. The positive current collector with no negative active substance layer exemplary serves as the negative tab. The negative current collector may be made of copper, and a negative active substance may be carbon, silicon, or the like. In order to ensure a flowing of a high current without generating fusing, a plurality of positive tabs is provided and stacked together, and a plurality of negative tabs is provided and stacked together.

The separator may be made of polypropylene (PP), polyethylene (PE), or the like. In addition, the electrode assembly may be of a wound structure or a laminated structure, and the embodiments of the present disclosure are not limited in this regard.

Figure 2:
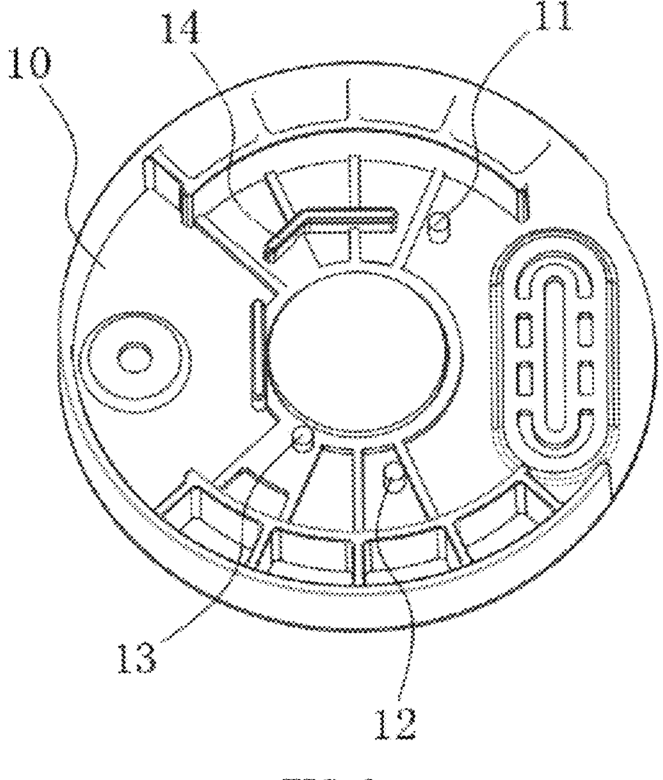
FIG. 2 is a schematic structural view of the first plastic member shown in FIG. 1.
Figure 3:
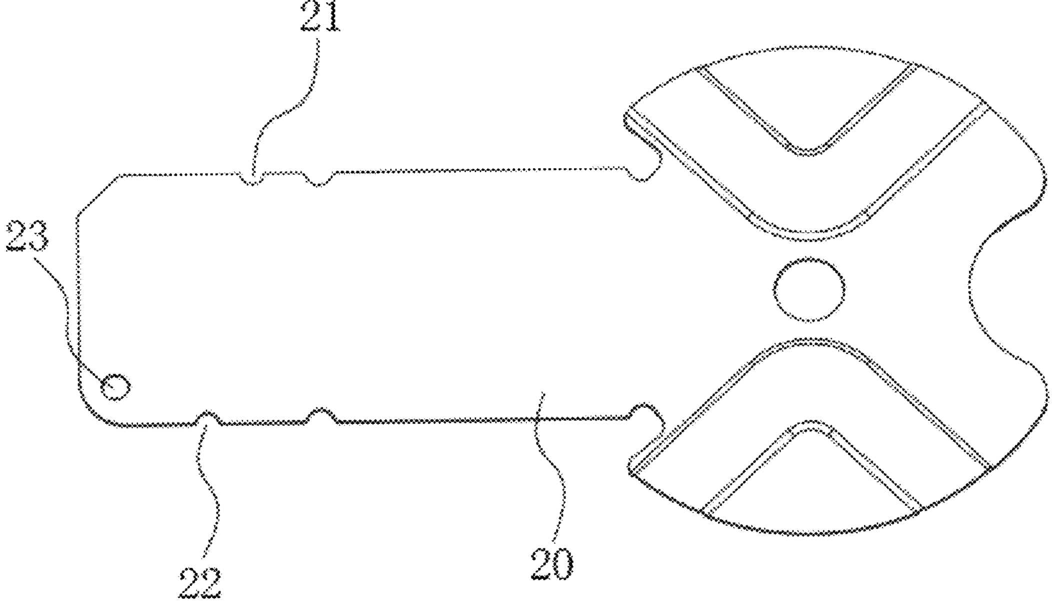
FIG. 3 is a schematic structural view of the first current collector shown in FIG. 1.
Figure 4:
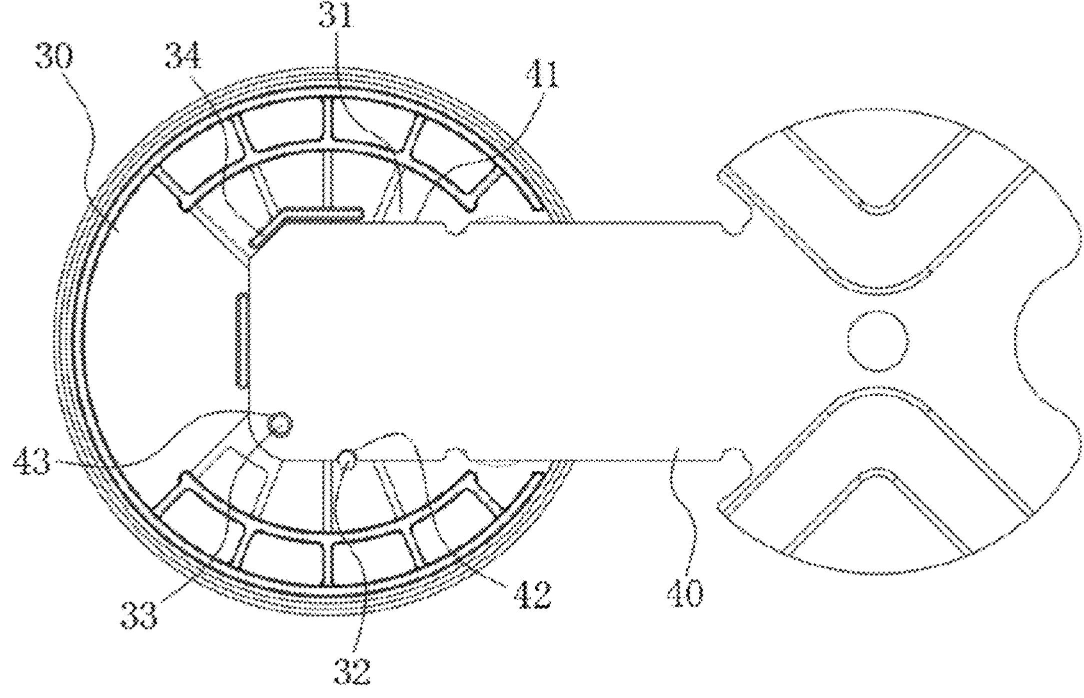
FIG. 4 is a view of an assembled structure of a second plastic member and a second current collector according to an embodiment of the present disclosure.
Figure 5:
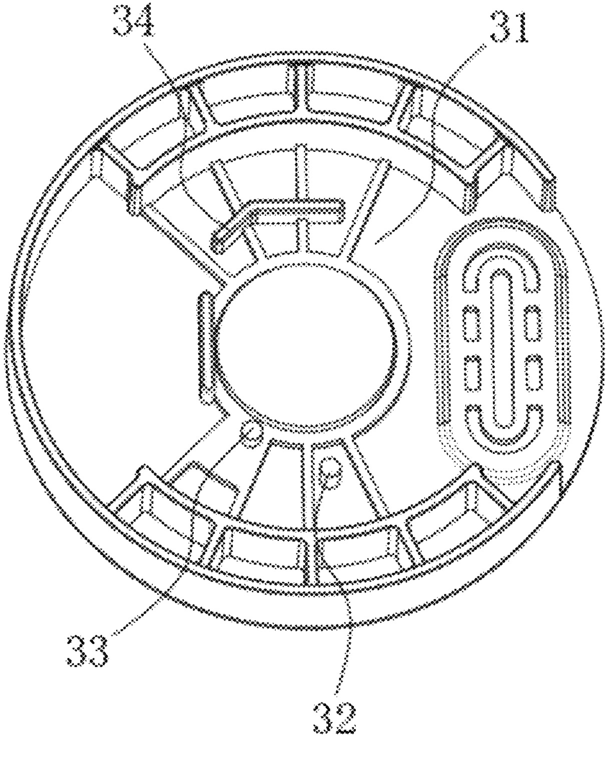
FIG. 5 is a schematic structural view of the second plastic member shown in FIG. 4.
Figure 6:
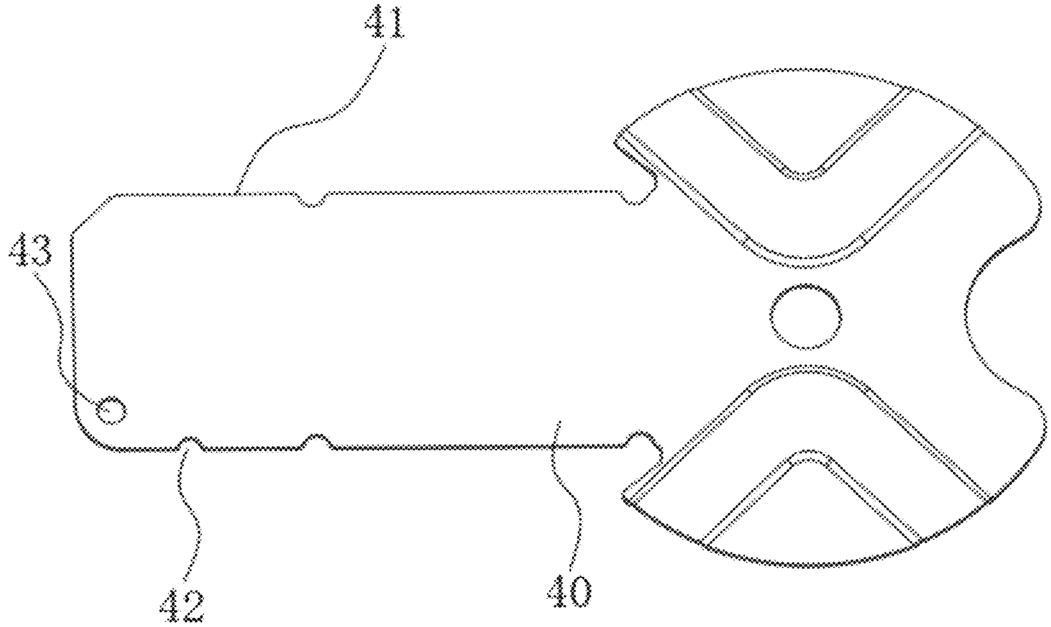
FIG. 6 is a schematic structural view of the second current collector shown in FIG. 4.

In an example, as illustrated in FIG. 1 to FIG. 4, an end cover assembly according to an embodiment of the present disclosure includes a first end cover and a second end cover. It may be understood that the first end cover corresponds to a negative end cover, and the second end cover corresponds to a positive end cover. Further, the first end cover includes a first plastic member 10 and a first current collector 20. The second end cover includes a second plastic member 30 and a second current collector 40.

It may be understood that, the first end cover is configured to be assembled at a negative terminal of the electrode assembly, and the second end cover is configured to be assembled at a positive terminal of the electrode assembly.

The first plastic member 10 is provided with a first mounting portion. The first current collector 20 is provided with a first mating portion. The first mating portion is assemblable with the first mounting portion. The second plastic member 30 is provided with a second mounting portion. The second current collector 40 is provided with a second mating portion. The second mating portion is assemblable with the second mounting portion. The first mounting portion is at least partially different from the second mounting portion, and the first mating portion is at least partially different from the second mating portion. In this case, mounting interference is generated between the first mounting portion and the second mating portion as well as between the second mounting portion and the first mating portion.

It may be noted that, the first mounting portion and the second mounting portion are not exactly the same to each other in structure, and the first mating portion and the second mating portion are not exactly the same to each other in structure. It can be understood that the second mounting portion is exactly or partially different from the first mounting portion in structure.

In the end cover assembly according to the embodiments of the present disclosure, the first mounting portion and the second mounting portion are not exactly the same to each other and the first mating portion, and the second mating portion are not exactly the same to each other. In this way, during assembling of the end cover assembly as described above, when an operator mistakenly assembles the first plastic member 10 and the second current collector 40 and mistakenly assembles the first current collector 20 and the second plastic member 30, the assembly between the first mounting portion and the second mating portion cannot be carried out due to the mounting interference therebetween, and the assembly between the second mounting portion and the first mating portion cannot be carried out due to the mounting interference therebetween. As a result, the operator can be promptly reminded of a matching error in components to correct this matching error in time, and then assembles the mated first mounting portion and first mating portion and assembles the mated second mounting portion and second mating portion. Therefore, an assembly of the first plastic member 10 and the first current collector 20 as well as an assembly of the second plastic member 30 and the second current collector 40 can be quickly and accurately completed to obtain the first end cover and the second end cover. As a result, it is possible to effectively avoid the incorrect assembly between the components, which may result in the re-disassembly and re-assembly and thus affect the manufacturing and the manufacturing efficiency of a battery. Therefore, an assembly quality of the battery and normal use of the battery can be ensured.

It may be noted that, in a mounting state, the first plastic member 10, the first current collector 20, the second plastic member 30, and the second current collector 40 are arranged in an axial direction of the electrode assembly and remain parallel to each other. In this way, positions and postures between the first plastic member 10, the first current collector 20, the second plastic member 30, and the second current collector 40 are relatively constant. In other words, a normal assembly between the first plastic member 10 and the first current collector 20 and a normal assembly between the second plastic member 30 and the second current collector 40 can only be carried out based on a predetermined relative positions and postures therebetween, otherwise the normal assembly and connection cannot be realized.

In this embodiment, the first mating portion is an end portion of the first current collector 20 assembled with the first mounting portion. Further, the first mating portion includes a first edge and a second edge opposite to the first edge. Similarly, the second mating portion is an end portion of the second current collector 40 assembled with the second mounting portion. Further, the second mating portion includes a third edge and a fourth edge opposite to the third edge. An arrangement of the first mating portion and the second mating portion at the end portions allows each of the first mating portion and the second mating portion to be easily inserted into the corresponding one of the first plastic member 10 and the second plastic member 30, so as to be assembled with the corresponding one of the first mounting portion and the second mounting portion.

In some embodiments, the first mounting portion includes a first positioning post 11. The first mating portion includes a first recess 21. The first recess 21 is formed at a first edge of the first current collector 20. The first positioning post 11 is configured to be arranged in the first recess 21. The second mounting portion includes an avoidance region 31. The second mating portion includes a planar portion or protruding portion 41. The planar portion or protruding portion 41 is formed at a third edge of the second current collector 40. The planar portion or protruding portion 41 is configured to be accommodated within the avoidance region 31. The first edge and the third edge are located on one side. The first positioning post 11 is located at a position corresponds to the avoidance region 31.

During a mounting operation, if the operator mistakenly assembles the first plastic member 10 and the second current collector 40, the planar portion or protruding portion 41 of the second mating portion will interfere with the first positioning post 11, thereby providing fool-proofing, which can timely and effectively remind the operator to make a correction. Thus, the first positioning post 11 can be correctly arranged in the first recess 21, and the planar portion or protruding portion 41 can be received in the avoidance region 31. As a result, it is possible to ensure a normal and reliable connection between the first plastic member 10 and the first current collector 20 as well as a normal and reliable connection between the second plastic member 30 and the second current collector 40.

Further, in the above embodiments, the first mounting portion further includes a second positioning post 12, and the first mating portion further includes a second recess 22. The second recess 22 is formed at a second edge of the first current collector 20. The second positioning post 12 is configured to be arranged in the second recess 22. The second edge is a side opposite to the first edge.

Since the second positioning post 12 can be arranged in the second recess 22, a positioning effect for the first current collector 20 can be enhanced. In addition, in this case, two opposite sides of the first current collector 20 can be positioned by a first positioning structure formed through an engagement between the first positioning post 11 and the first recess 21 and a second positioning structure formed through an engagement between the second positioning post 12 and the second recess 22, respectively. Therefore, it is possible to effectively limit a degree of freedom of movement and rotation of the first current collector 20, ensuring stable mounting of the first current collector 20.

In addition, in some other embodiments, the first mounting portion further includes a fourth positioning post 13, and the first mating portion further includes a first positioning hole 23. The fourth positioning post 13 is configured to be inserted into the first positioning hole 23. In this way, the positioning effect for the first current collector 20 can be further enhanced, which can ensure a stable assembly between the first plastic member 10 and the first current collector 20 to avoid easy disengagement therebetween.

It may be noted that, the above-mentioned negative positioning posts and negative recesses may be of shapes matching with each other, such as round shapes, square shapes, and other shapes, which can be selected as desired. In addition, a size of each of the negative positioning posts and the negative recesses may not be too large, and is generally smaller than or equal to 3 mm. An end portion of each negative positioning post may extend out of the corresponding one of the negative recesses by a height difference smaller than or equal to 2 mm.

In addition, in any one of the above embodiments, the second mounting portion further includes a third positioning post 32, and the second mating portion further includes a third recess 42. The third recess 42 is formed at a fourth edge of the second current collector 40. The third positioning post 32 is configured to be arranged in the third recess 42. The fourth edge is located at a side opposite to the third edge. Mounting and positioning of the second plastic member 30 and the second current collector 40 can be realized by inserting the third positioning post 32 into the third recess 42.

Further, in any one of the above embodiments, the second mounting portion further includes a fifth positioning post 33, and the second mating portion further includes a second positioning hole 43. The fifth positioning post 33 is configured to be arranged in the second positioning hole 43. In this way, a positioning effect for the second current collector 40 can be further enhanced to better limit a degree of freedom of the second current collector 40. Therefore, it is possible to ensure a stable assembly between the second plastic member 30 and the second current collector 40 to avoid easy disengagement therebetween. It may be noted that a distance between the second recess 22 and the first positioning hole 23 is unequal to a distance between the third recess 42 and the second positioning hole 43. Such a manner can also form a fool-proofing design to prevent incorrect assembly.

Further, in any one of the above embodiments, the first mounting portion further includes a first stop edge 14 configured to be abutted against the first edge of the first current collector 20 for positioning, and/or the second mounting portion further includes a second stop edge 34 configured to be abutted against the third edge of the second current collector 40 for positioning. In this embodiment, each of the first stop edge 14 and the second stop edge 34 may have integrated bent protruding structure or segmented bent protruding structure, for example, an L-shape structure. The first stop edge 14 and the second stop edge 34 are configured to be respectively abutted against two adjacent side portions of the first current collector 20 and the second current collector 40 in different directions for positioning and limiting on the degree of freedom. Therefore, connection reliability between the first plastic member 10 and the first current collector 20 as well as connection reliability between the second plastic member 30 and the second current collector 40 can be improved.

According to another embodiment of the present disclosure, an electric device including a battery module is also provided. The battery module includes the battery cell according to any one of the above embodiments.

The battery cell may include a lithium-ion secondary battery, a lithium-ion primary battery, a lithium-sulfur battery, a sodium-lithium-ion battery, a sodium-ion battery, a magnesium-ion battery, or the like, and the embodiments of the present disclosure are not limited in this regard. The battery cell may be in a shape of a cylinder, a flat body, a rectangular body, or the like, and the embodiments of the present disclosure are also not limited in this regard. According to different encapsulating ways, the battery cell is generally divided into three types including a cylindrical battery, a square battery, and a soft package battery.

The battery module according to the embodiments of the present disclosure refers to a single physical module including one or more battery cells to provide a higher voltage and capacity. The battery module generally includes a casing for packaging the one or more battery cells. The casing can prevent a liquid or other foreign matters from interfering with charging or discharging of the battery cell.

The electric device may be in various forms, e.g., a cell phone, a portable device, a laptop, a battery cart, an electric vehicle, a ship, a spacecraft, an electric toy, and an electric tool. For example, the spacecraft includes an airplane, a rocket, a space shuttle, a spaceship, etc. The electric toy includes a stationary electric toy or a mobile electric toy, e.g., a game console, an electric vehicle toy, an electric boat toy, and an electric airplane toy. The electric tool includes an electric metal cutting tool, an electric grinding tool, an electric assembly tool, and an electric railway-specific tool, e.g., an electric drill, an electric sander, an electric wrench, an electric screwdriver, an electric hammer, an electric impact drill, a concrete vibrator, and an electric planer.

Technical features in the above embodiments may be combined arbitrarily. In order to make the description concise, all possible combinations of the technical features in the above embodiments are not described. However, as long as there is no conflict between the technical features in the embodiments, any combination of technical features in the above embodiments should be considered as falling within the scope of the present disclosure.

The above embodiments illustrate merely some implementations of the present disclosure, which are described in details but should not be construed to limit the scope of the present disclosure. It should be noted that, for those of ordinary skilled in the art, without departing from the concept of the present disclosure, various modifications and improvements can be made, which are fallen within the scope of the present disclosure. Therefore, the scope of the present disclosure shall be defined by the claims as appended.

In the description of the present disclosure, it should be understood that, the orientation or the position indicated by terms such as "center", "longitudinal", "lateral", "length", "width", "thickness", "over", "below", "front", "rear", "left", "right". "vertical", "horizontal". "top", "bottom", "inner", "outer", "clockwise", "anti-clockwise", "axial", "radial", and "circumferential" should be construed to refer to the orientation and the position as shown in the drawings, and is merely for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, unless otherwise specifically defined.

In the present disclosure, unless otherwise clearly specified and limited, terms such as "install", "connect", "connect to", "fix", and the like should be understood in a broad sense. For example, it may be a fixed connection or a detachable connection or connection as one piece; mechanical connection or electrical connection; direct connection or indirect connection through an intermediate; internal communication of two components or the interaction relationship between two components, unless otherwise clearly limited. For those skilled in the art, the specific meaning of the above-mentioned terms in the present disclosure can be understood according to specific circumstances.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

It should be noted that when an element is described as being "fixed to" or "arranged on" another element, it may be directly on the other element or an intermediate element may exit. When an element is interpreted as being "connected" to another element, it may be directly connected to the other element or an intermediate element may exit simultaneously. As used herein, the terms "vertical", "horizontal", "over", "below", "left", and "right" and similar expressions are used for illustrative purposes only and are not meant to be the only means of implementation.

What is claimed is:

1. An end cover assembly, comprising:

a first end cover; and a second end cover, wherein:

the first end cover comprises a first plastic member and a first current collector, the first plastic member being provided with a first mounting portion, the first current collector being provided with a first mating portion, and the first mating portion being assemblable with the first mounting portion;

the second end cover comprises a second plastic member and a second current collector, the second plastic member being provided with a second mounting portion, the second current collector being provided with a second mating portion, and the second mating portion being assemblable with the second mounting portion; and the first mounting portion is at least partially different from the second mounting portion, and the first mating portion is at least partially different from the second mating portion, in such a manner that the first mounting portion is not assemblable with the second mating portion, and the second mounting portion is not assemblable with the first mating portion.

2. The end cover assembly according to claim 1, wherein:

the first mating portion is an end portion of the first current collector assembled with the first mounting portion, and comprises a first edge and a second edge opposite to the first edge; and the second mating portion is an end portion of the second current collector assembled with the second mounting portion, and comprises a third edge and a fourth edge opposite to the third edge.

3. The end cover assembly according to claim 2, wherein the first mounting portion comprises a first positioning post, and the first mating portion comprises a first recess formed at the first edge, the first positioning post being configured to be arranged in the first recess.

4. The end cover assembly according to claim 2, wherein:

the first mounting portion comprises a second positioning post, and the first mating portion comprises a second recess formed at the second edge, the second positioning post being configured to be arranged in the second recess; and the second mounting portion comprises a third positioning post, and the second mating portion comprises a third recess formed at the fourth edge, the third positioning post being configured to be arranged in the third recess.

5. The end cover assembly according to claim 4, wherein:

the first mounting portion further comprises a fourth positioning post, and the first mating portion further comprises a first positioning hole, the fourth positioning post being configured to be inserted into the first positioning hole;

the second mounting portion further comprises a fifth positioning post, and the second mating portion further comprises a second positioning hole, the fifth positioning post being configured to be inserted into the second positioning hole; and a distance between the second recess and the first positioning hole is unequal to a distance between the third recess and the second positioning hole.

6. The end cover assembly according to claim 2, wherein the first mounting portion further comprises a first stop edge configured to be abutted against the first edge for positioning.

7. The end cover assembly according to claim 2, wherein the second mounting portion further comprises a second stop edge configured to be abutted against the third edge for positioning.

8. A battery cell, comprising the end cover assembly according to claim 1.

9. The battery cell according to claim 8, wherein:

the first mating portion is an end portion of the first current collector assembled with the first mounting portion, and comprises a first edge and a second edge opposite to the first edge; and the second mating portion is an end portion of the second current collector assembled with the second mounting portion, and comprises a third edge and a fourth edge opposite to the third edge.

10. The battery cell according to claim 9, wherein the first mounting portion comprises a first positioning post, and the first mating portion comprises a first recess formed at the first edge, the first positioning post being configured to be arranged in the first recess.

11. The battery cell according to claim 9, wherein:

the first mounting portion comprises a second positioning post, and the first mating portion comprises a second recess formed at the second edge, the second positioning post being configured to be arranged in the second recess; and the second mounting portion comprises a third positioning post, and the second mating portion comprises a third recess formed at the fourth edge, the third positioning post being configured to be arranged in the third recess.

12. The battery cell according to claim 11, wherein:

the first mounting portion further comprises a fourth positioning post, and the first mating portion further comprises a first positioning hole, the fourth positioning post being configured to be inserted into the first positioning hole;

the second mounting portion further comprises a fifth positioning post, and the second mating portion further comprises a second positioning hole, the fifth positioning post being configured to be inserted into the second positioning hole; and a distance between the second recess and the first positioning hole is unequal to a distance between the third recess and the second positioning hole.

13. The battery cell according to claim 9, wherein the first mounting portion further comprises a first stop edge configured to be abutted against the first edge for positioning.

14. The battery cell according to claim 9, wherein the second mounting portion further comprises a second stop edge configured to be abutted against the third edge for positioning.

15. A battery module, comprising at least one battery cell, each of the at least one battery cell being the battery cell according to claim 8.

16. An electric device, comprising the battery module according to claim 15.

* * * * *